(12) United States Patent
Tomobe

(10) Patent No.: US 7,079,647 B2
(45) Date of Patent: Jul. 18, 2006

(54) IP TELEPHONE WITH POWER SOURCE CIRCUIT

(75) Inventor: Masaharu Tomobe, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 448 days.

(21) Appl. No.: 10/081,155

(22) Filed: Feb. 25, 2002

(65) Prior Publication Data
US 2002/0118823 A1    Aug. 29, 2002

(30) Foreign Application Priority Data
Feb. 26, 2001 (JP) .............................. 2001-050345

(51) Int. Cl.
    H04M 1/00 (2006.01)
(52) U.S. Cl. ...................... 379/413; 323/908
(58) Field of Classification Search ........... 379/399.07, 379/395.07, 473, 387.01, 395.01, 399.01, 379/413; 363/49; 323/298, 908
See application file for complete search history.

(56) References Cited

U.S. PATENT DOCUMENTS 4,631,470 A * 12/1986 Bingley ................ 323/282
5,973,942 A * 10/1999 Nelson et al. ........... 363/21.01
6,804,351 B1 * 10/2004 Karam ..................... 379/413
2002/0091951 A1 * 7/2002 Jaeger et al. .............. 713/300

FOREIGN PATENT DOCUMENTS

JP          8-9071       1/1996
JP          2000-69206   3/2000

* cited by examiner

Primary Examiner—Sinh Tran
Assistant Examiner—Walter F Briney, III
(74) Attorney, Agent, or Firm—Foley & Lardner LLP

(57) ABSTRACT

An IP telephone has a power source circuit. A direct current from a network is used to charge an input capacitor via an input current limiting resistor. A resultantly charged voltage is inputted to and is converted by a DC/DC converter to produce an output voltage. In parallel with the input current limiting resistor, a limit removing unit including a switching transistor is arranged. The output voltage is delayed by a delay circuit to activate a driving transistor, which drives the switching transistor. The input voltage to the converter is monitored by an input voltage sensor. Therefore, the telephone power source circuit copes with a plurality of hubs of different power supplying specifications in an internet (IP) telephone network in which telephones are connected to a local-area network of the IEEE802.3 standard and the like.

16 Claims, 3 Drawing Sheets

IP TELEPHONE WITH POWER SOURCE CIRCUIT

BACKGROUND OF THE INVENTION

The present invention relates to a power source circuit, and in particular, to a telephone power source circuit for supplying an internet protocol (IP) telephone with electric power necessary for operation of constituent components of the telephone.

DESCRIPTION OF THE PRIOR ART

A telephone power source circuit of this kind has been described, for example, in Japanese Patent Laid-Open No. HEI8-9071 entitled "A Power Source Circuit for Communication Apparatus" and Japanese Patent Laid-Open No. 2000-69206 "A Power Supply System for a Telephone Terminal for Use with Local Area Network (LAN)". In these systems of the prior art, the power source circuit is simply connected to a direct-current to direct-current (DC/DC) converter. Therefore, the systems cannot cope with a hub which can supply power to devices such as IP telephones which are expected to be broadly used in the world in future.

FIGS. 1 and 2 are circuit diagrams of a power source circuit of the prior art according to Japanese Patent Laid-Open No. HEI8-9071. The power supply circuit of the communication apparatus receives as power an alternating-current (AC) of 100 volt (commercial power source) 12. The circuit includes a main power source 11 to transform the input power 12 according to capacity of the system, for example, into a direct current of −48 volt (for large capacity) or a direct current of −24 volt (for small capacity). The system further includes a power source circuit 10 which includes input terminals 1a and 1b and output terminals 5a and 5b, and which receives the DC voltage to produce a stabilized voltage. To stabilize the output voltage (a direct current of −48 volt), the power source circuit 10 includes an input voltage detector 5a and 5b as shown in FIG. 1.

FIG. 2 shows the power source circuit 10 of FIG. 1 and particularly a concrete circuit configuration of the input voltage detector circuit 2 and the power source controller circuit 3. The input voltage detector 2 includes a pnp-type transistor Tr1 including a base, a collector, and an emitter, a series circuit which includes a zener diode Z1 and a resistor R1 and which is connected between the input terminals 1a and 1b, and a resistor R2 connected in series between a connecting point between the diode Z1 and the resistor R1 and the base of the transistor Tr1. On the other hand, the power controller 3 includes a series connection of a zener diode Z2 and a resistor R3 between the input terminals 1a and 1b, a pnp-type transistor Tr2 including a collector, an emitter, and a base, and a resistor R4 coupled between the collector of the transistor Tr2 and the input terminal 1a. The zener diode Z2 is connected to the collector and the emitter of the transistor Tr1 at both ends. The base of the transistor Tr2 is linked to a connecting point between the zener diode Z2 and the resistor R3. The DC/DC converter 4 includes four terminals 4a to 4d. The terminals 4a and 4d are coupled with the output terminals 5b and 5a, respectively. The terminal 4c is connected via a diode 6 to the output terminal 5a. The terminal 4b is linked with the emitter of the transistor Tr2.

The power source hubs connected to an IP telephone network generally available in the market are specified in two ways as below.

Specification A: A rush current has a maximum value of about 400 milliampere (mA) when an IP telephone is connected to the hub.

Specification B: After input capacity of an IP telephone is detected, the hub starts supplying power thereto. The input capacity is measured using a fixed current and must be in a range from 47 microfarad (μF) to 470 μF. Therefore, it is required that the DC/DC converter of the IP telephone starts producing its output after the input capacity is completely charged.

However, the prior art described above cannot cope with a plurality of hubs or IP telephones of different power supply types such as specifications A and B.

SUMMARY OF THE INVENTION

It is therefore an object of the present invention to provide a telephone power source circuit of a relatively simple configuration capable of coping with a plurality of hubs of different power supply types.

In accordance with the present invention, there is provided a telephone power source circuit for an internet protocol (IP) telephone connected to a network, in which a direct current with a signal is received via the network for charging an input capacitor to thereby obtain operation voltage of each constituent components of the IP telephone, comprising a direct-current to direct-current (DC/DC) converter for obtaining a voltage to charge the input capacitor, and an input current limiting resistor connected to an input terminal of the DC/DC converter for limiting the direct current inputted from the network.

In accordance with the present invention, the telephone power source circuit further comprises an input voltage sensor circuit for monitoring an input voltage to the DC/DC converter, and an output from the DC/DC converter is delayed according to a result of the monitoring by the input voltage sensor circuit. The input capacitor has a capacity of about 100 μF. The telephone power source circuit further comprises limit removing means for removing the limitation imposed by the input current limiting resistor. The limit removing means is a switching transistor connected in parallel with the input current limiting resistor. The switching transistor is driven by a driving transistor, the driving transistor operating according to a voltage received via a delay circuit from the DC/DC converter. The IP telephone includes a central processing unit (CPU), the CPU determining control timing for turning the switching transistor on or off.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Referring next to the accompanying drawings, description will be given in detail of a configuration and operation of an embodiment of a telephone power source circuit in accordance with the present invention.

Figure 3:
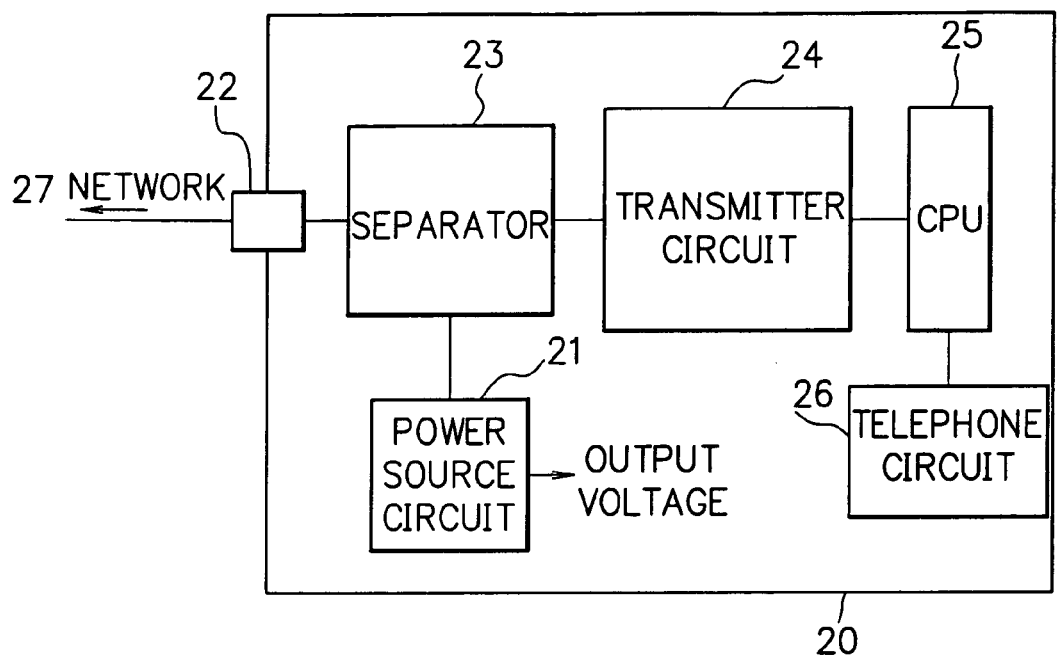
FIG. 3 is a schematic block diagram showing a configuration of an IP telephone to which a power source circuit in accordance with the present invention can be applied.

FIG. 3 shows in a block diagram a configuration of an IP telephone including a telephone power source circuit in accordance with the present invention. The IP telephone 20 includes a power source circuit 21, a connector of RJ45 type 22, a separator 23, a transmitter circuit 24, a central processing unit (CPU) 25, and a telephone circuit 26. The connector 22 is directly connected to a network 27. The separator 23 receives a signal via the network 27 and separates a digital signal from a direct current contained in the signal. The transmitter circuit 24 terminates a physical layer of the network 27. The CPU 25 controls operation of the telephone 20. The telephone circuit 26 includes an audio circuit, a microphone, a speaker, a dial button, a facsimile switch, and the like. The power source (telephone power source) circuit 21 in accordance with the present invention supplies power necessary for operation of the respective constituent components of the telephone 20.

Figure 4:
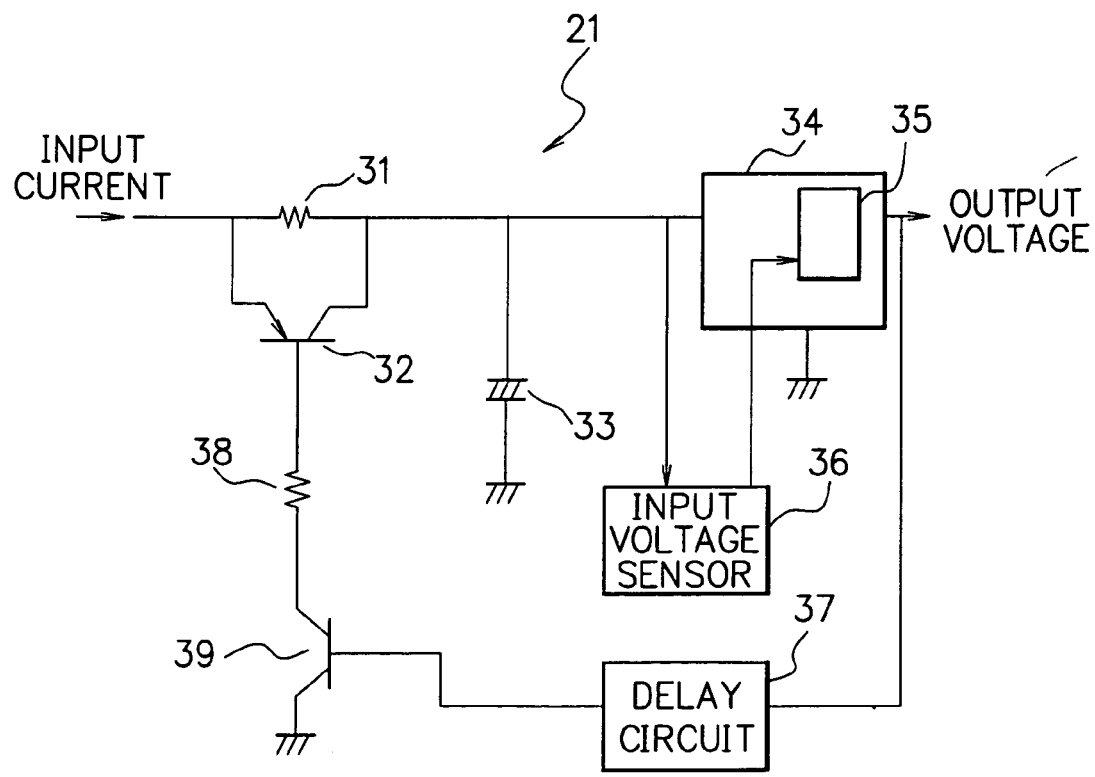
FIG. 4 is a circuit diagram showing an embodiment of a telephone power source circuit in accordance with the present invention.

FIG. 4 shows a configuration of an embodiment of the telephone power source 21 of FIG. 3. The power source 21 includes a current limiting resistor 31, a transistor (a limit removing device or a switching transistor) 32 including a collector, an emitter, and a base, a driving transistor 39 including a collector, an emitter, and a base, an input capacitor 33, a DC/DC converter 34, an input voltage sensor circuit 36, a delay circuit 37, and a base limiting resistor 38. The converter 34 includes a delay circuit 35. The emitter and the collector of the transistor 32 respectively connected to an end and another end of the resistor 31. The base of the transistor 32 is grounded via the resistor 38 and the collector and the emitter of the transistor 39. The converter 34 applies an output voltage via the delay circuit 37 to the base of the transistor 39. The converter 34 is connected to a connecting point at which the resistor 31, the collector of the transistor 32, and the input capacitor 33 are connected to each other. A voltage at the connecting point is applied via the input voltage sensor 36 to the delay circuit 35 of the converter 34.

The resistor 31 limits an input current supplied to the circuit system. The transistor 32 removes a current limitation imposed by the resistor 31. The input capacitor 33 is disposed to remove an input ripple of the DC/DC converter 34. To satisfy specification B described above, the capacitor 33 has a capacity of about 100 μF. The converter 34 produces a stabilized output voltage regardless of variation in the input voltage. The delay circuit 35 delays the input voltage supplied to the converter 34. The input voltage sensor 36 senses the input voltage and interrupts the output from the converter 34 for a predetermined period of time. After the output voltage from the converter 34 is sensed, the delay circuit 37 turns the driving transistor 39 on (sets the transistor 39 to a conductive state) with a delay of a fixed period of time to thereby remove the current limitation imposed by the current limiting resistor 31. The resistor 38 limits a base current of the transistor 32. The transistor 39 turns the transistor 32 on or off using an output from the delay circuit 37.

Referring now to FIGS. 3 and 4, description will be given in detail of operation of the telephone power source circuit in accordance with the present invention. The signal on the network 27 includes a signal and voice to be communicated with the telephone 20 and a direct current to operate the telephone 20. In the telephone 20, the separator 23 separates the signal from the direct current. The signal is fed to the transmitter 24, and the direct current is supplied to the power source circuit 21. The power source 21 supplies each constituent circuit block of the telephone 20 with its operating power. The CPU 25 to control the overall operation of the telephone 20 controls the telephone circuit 26 achieving basic operations such as a telephone call and a dialing operation. The CPU 25 also communicates via the transmitter circuit 24 with the network 27 so that the telephone 20 conducts necessary operations.

The power source circuit 21 shown in FIG. 4 operates as follows. In an initial state, the converter 34 does not send its output to the delay circuit 37, which accordingly does not produce its output to the transistor 39. Therefore, the transistors 39 and 32 are off (non-conductive). When the network 27 starts supplying a signal and power to the circuit system, a current of the power is controlled by the current limiting resistor 31 to charge the input capacitor 33. Until the charged voltage of the capacitor 33 reaches a predetermined value, the input voltage sensor 36 interrupts the output from the converter 34.

Figure 1:
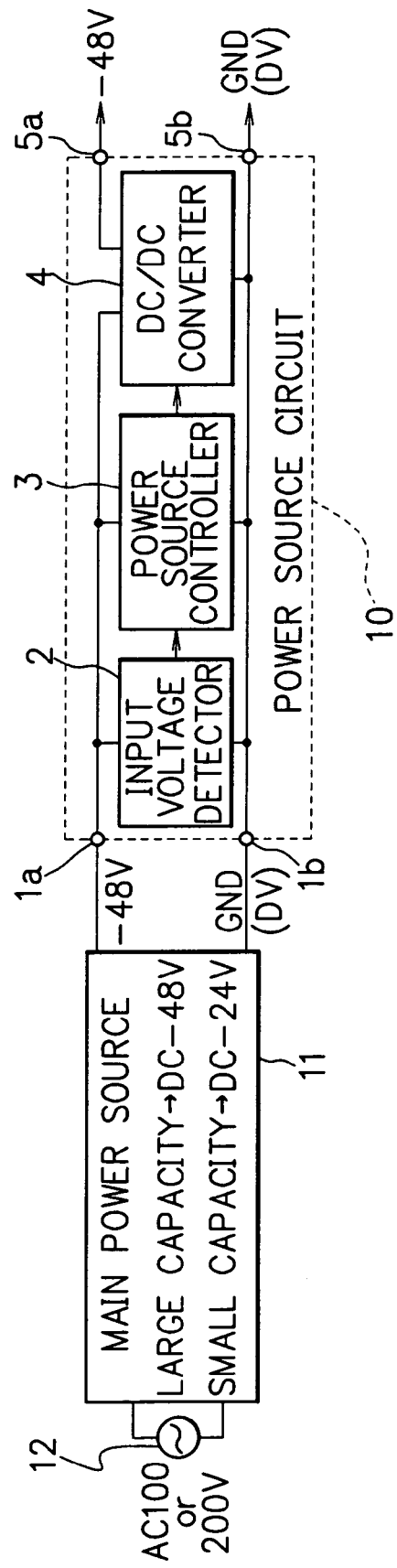
FIG. 1 is a block diagram showing a power source circuit of a communication device in the prior art.
Figure 2:
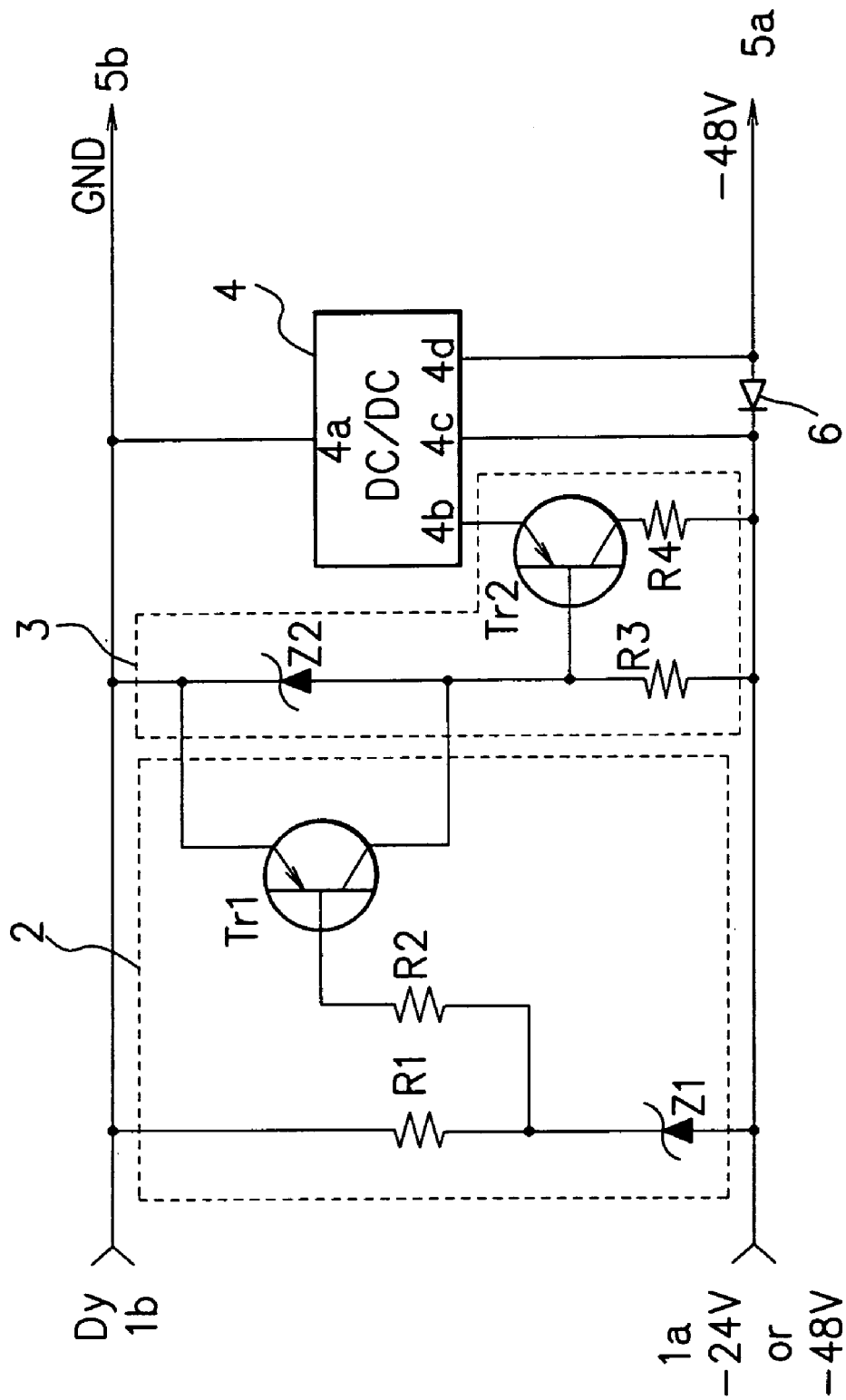
FIG. 2 is a circuit diagram showing details of the power source circuit of FIG. 1.

After a lapse of time provided by the delay circuit 37, the converter 34 supplies the output voltage to all constituent circuits of the telephone 20 shown in FIG. 1 to resultantly start operation of the telephone 20. However, in a state in which a maximum power consumption load is imposed onto the telephone 20, there exists a fear that the telephone 20 cannot conduct a normal operation because of power loss by the current limiting resistor 31. The operation of the telephone 20 with the maximum power consumption load is guaranteed as below. When the converter 34 produces its output, the transistor 39 is turned on (set to a conductive state) after a predetermined delay time by the delay circuit 37. This sets the transistor 32 also to a conductive state. Therefore, the influence of the current limiting resistor 31 is removed and the operation with the maximum load is guaranteed. Since power consumption of the resistor 31 is reduced, the overall power consumption of the telephone 20 is also lowered.

The configuration above resultantly satisfies the specified current of 400 mA of the rush current when the system is connected according to specification A described above. On the other hand, when the system is connected according to specification B, the input voltage sensor 36 keeps the output voltage from the converter 34 from turning on (keeps the converter 34 from being set to a conductive state) until the charged voltage of the capacitor 33 reaches a predetermined value, and hence the correct capacity can be kept retained. Therefore, the requirement of specification B is also satisfied by the configuration of the power source circuit in accordance with the present invention.

In the embodiment, when the converter 34 produces an output voltage, the transistor 39 is turned on to a conductive state after a lapse of a predetermined period of time provided by the delay circuit 37. However, the transistor 39 may also be controlled by the CPU 25 in the telephone 20. The CPU 25 supervises all control operations of the telephone 20 and can hence easily recognize power being presently consumed by the telephone 20. The CPU 25 can therefore detect timing to invalidate the current limiting resistor 31 using the current power consumption of the CPU 25 to thereby more precisely control the operation.

Description has been given of a configuration and operation of embodiments of the telephone power source circuit in accordance with the present invention. The embodiments are only examples embodying the present invention, and hence the present invention is not restricted by the embodiments. It will be easy for those skilled in the art to change or to modify the embodiments for various purposes within the scope and spirit of the present invention. For example, a field-effect transistor (FET) and/or a metal-oxide semiconductor (MOS) may be used as the switching transistor 32 and the driving transistor 39.

As described above, the telephone power source circuit in accordance with the present invention leads to practical advantages as below. The requirements of IP telephones of specifications A and B can be satisfied. This is because the input capacitor is charged via the current limiting resistor and the limit removing device, i.e., a switching transistor, and the charged voltage is sensed by the input voltage sensor circuit to resultantly drive the DC/DC converter. Additionally, in accordance with the present invention, the telephone power source circuit can be constructed in a simple configuration.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An internet protocol (IP) telephone, comprising:
   an input connector for receiving from a network a signal containing a digital component and a current component;
   a separator for separating said current component from said digital component;
   telephone circuitry for providing audio input and output;
   a central processing unit (CPU) for controlling operations of said telephone circuitry to cause said telephone circuitry to provide said audio input and output; and
   a power source circuit for receiving said current component from said separator, said power source circuit comprising:
      an input current limiting resistor for limiting said current component;
      a direct-current to direct-current (DC/DC) converter that is connected to said input current limiting resistor;
      an input capacitor that is charged by said current component; and
      limit removing means for removing the limitation imposed by said input current limiting resistor when said limit removing means is turned on;
   wherein said CPU is configured to determine an amount of power being consumed by said CPU; and
   wherein said CPU is configured to turn said limit removing means on or off based on the determined amount of power being consumed by the CPU.

2. The IP telephone in accordance with claim 1, said power source circuit further comprising an input voltage sensor circuit for monitoring an input voltage to said DC/DC converter, an output from said DC/DC converter being delayed according to a result of the monitoring by said input voltage sensor circuit.

3. The IP telephone in accordance with claim 2, wherein said input capacitor has a capacity of about 100 μF.

4. The IP telephone in accordance with claim 3, wherein said limit removing means is a switching transistor connected in parallel with said input current limiting resistor.

5. The IP telephone in accordance with claim 4, wherein said CPU determines control timing for turning said switching transistor on or off based on the determined amount of power being consumed by the CPU.

6. The IP telephone in accordance with claim 2, wherein said limit removing means is a switching transistor connected in parallel with said input current limiting resistor.

7. The IP telephone in accordance with claim 6, wherein said CPU determines control timing for turning said switching transistor on or off based on the determined amount of power being consumed by the CPU.

8. The IP telephone in accordance with claim 1, wherein said input capacitor has a capacity of about 100 μF.

9. The IP telephone in accordance with claim 8, wherein said limit removing means is a switching transistor connected in parallel with said input current limiting resistor.

10. The IP telephone in accordance with claim 9, wherein said CPU determines control timing for turning said switching transistor on or off based on the determined amount of power being consumed by the CPU.

11. The IP telephone in accordance with claim 1, wherein said limit removing means is a switching transistor connected in parallel with said input current limiting resistor.

12. The IP telephone in accordance with claim 11, wherein said CPU determines control timing for turning said switching transistor on or off based on the determined amount of power being consumed by the CPU.

13. The IP telephone in accordance with claim 1, wherein said input capacitor is charged by said current component through said input current limiting resistor upon power-up of said IP telephone.

14. The IP telephone in accordance with claim 1, wherein said telephone circuitry comprises:
   a microphone for providing said audio input; and
   a speaker for providing said audio output.

15. The IP telephone in accordance with claim 1, wherein said CPU is configured to control said telephone circuitry to achieve telephone calling and dialing operations.

16. The IP telephone in accordance with claim 1, further comprising:
   a transmitter circuit for receiving said digital component of said signal from said separator;
   wherein said CPU is configured to communicate with said network through said transmitter circuit.

* * * * *